(12) United States Patent
Richey

(10) Patent No.: US 9,647,756 B2
(45) Date of Patent: May 9, 2017

(54) ADJUSTABLE RETURN BANDWIDTH IN CATV NODES INCLUDING RFOG OPTICAL UNITS (R-ONU)

(71) Applicant: Steven K Richey, Conway, SC (US)

(72) Inventor: Steven K Richey, Conway, SC (US)

( * ) Notice: Subject to any disclaimer, the term of this patent is extended or adjusted under 35 U.S.C. 154(b) by 40 days.

(21) Appl. No.: 14/488,065

(22) Filed: Sep. 16, 2014

(65) Prior Publication Data

US 2015/0082369 A1    Mar. 19, 2015

Related U.S. Application Data

(60) Provisional application No. 61/878,595, filed on Sep. 16, 2013.

(51) Int. Cl.
*H04B 10/2575* (2013.01)
(52) U.S. Cl.
CPC .............................. *H04B 10/25751* (2013.01)
(58) Field of Classification Search
CPC .......................... H04B 10/25751; H04N 21/06
See application file for complete search history.

(56) References Cited

U.S. PATENT DOCUMENTS 9,209,898 B1 * 12/2015 Schemmann ...... H04N 21/6168
2014/0282783 A1 * 9/2014 Totten ................. H04L 12/2885
725/111

* cited by examiner

*Primary Examiner* — Benjamin R Bruckart
*Assistant Examiner* — Tien M Nguyen
(74) *Attorney, Agent, or Firm* — Weiss & Moy, P.C.; Jeffrey D. Moy

(57) ABSTRACT

A Cable Television (CATV) node circuit has a forward pathway having a fiber optic input and a forward output. The first pathway passes a forward signal to the forward output in a first frequency range. A return pathway is coupled to the forward pathway. The return pathway has a fiber optic output. The return pathway passes a return signal to the fiber optic output in a second frequency range, wherein the first frequency range is higher than the second frequency range. A cancellation circuit is coupled to the forward pathway and the return pathway. The cancellation circuit separates and isolates the forward signal from the return signal.

15 Claims, 4 Drawing Sheets

| R-ONU Return Analysis | | | | | |
|---|---|---|---|---|---|
| Forward Level | Return Level | DC Isolation | Forward @Return Input | Phase Cancelation | Separation |
| dBmv | dBmv | dB | dBmv | dB | dBc |
| 18 | 45 | 25 | -32 | 25 | 50 |

| Node Return Analysis | | | | | |
|---|---|---|---|---|---|
| Forward Level | Return Level | DC Isolation | Forward @Return Input | Phase Cancelation | Separation |
| dBmv | dBmv | dB | dBmv | dB | dBc |
| 38 | 18 | 25 | -12 | 25 | 40 |

Figure 6

ADJUSTABLE RETURN BANDWIDTH IN CATV NODES INCLUDING RFOG OPTICAL UNITS (R-ONU)

RELATED APPLICATIONS

This patent application is related to U.S. Provisional Application No. 61/878,595, filed Sep. 16, 2013, entitled "PATENT APPLICATION FOR ADJUSTABLE RETURN BANDWIDTH IN CATV NODES, INCLUDING RFoG OPTICAL NETWORK UNITS (R-ONU)" in the name of the same inventor stated above, and which is incorporated herein by reference in its entirety. The present patent application claims the benefit under 35 U.S.C §119(e).

FIELD OF THE INVENTION

This invention relates generally to cable television (CATV) and broadband nodes and, more particularly, to a device that allows a CATV/Telecom operator with the ability to utilize frequency spectrum in the crossover area of diplex filters that before now was unusable and which allows the flexibility to make adjustments in the forward and return split by simply changing the frequency allocation at the head end.

BACKGROUND OF THE INVENTION

A fiber optic node may have a broadband optical receiver, which converts the downstream optically modulated signal coming from the headend/hub to an electrical signal going to the homes. Presently, the downstream signal is a RF modulated signal that typically begins at 50 MHz and ranges from 550-1000 MHz on the upper end. The fiber optic node also contains a reverse/return path transmitter that sends communication from the home back to the headend. In North America, this reverse signal is a modulated RF ranging from 5-40 MHz while in other parts of the world, the range is 5-65 MHz.

In a typical non-scalable node, the return path may be regulated by a diplex filter with the low (return) frequency side set to pass approximately 5-40 MHz and the high (forward) side set to pass approximately 51-1000 MHz. As stated above, other frequency splits may be used such as the European split of approximately 5-65 MHz reverse and approximately 85-1000 MHz forward. The present state of the art requires that the diplex filters be physically changed in order to change the frequency split and to allow more low or return bandwidth. In an amplifier the presence of both forward and return provides a circular feedback path and diplex filters, with high isolation at the crossover frequency are required to prevent oscillation. In a node there is no circular path as the input is light and output is RF and oscillations are not a problem.

A typical CATV R-ONU generally has a return path that is non-adjustable without physically changing the diplex filters. Referring to FIG. 1, a block diagram of a typical CATV R-ONU 10 is shown. In the CATV R-ONU 10, the fiber optic input signal may be converted to an RF signal and then combined on the output with the incoming return signal by the use of a diplex filter 12. The typical output signal level may be approximately 16-20 dBmv while the return level may be approximately 40-50 dBmv. The bandwidth of the return is generally limited to 40 MHz by the diplex filter 12 and the frequency between 40 and 51 MHz is generally unusable.

A typical CATV Node has a return path that is non-scalable without physically changing the diplex filters. Referring to FIG. 2, a block diagram of a typical CATV Node 20 is shown. In the CATV node 20, the fiber optic input signal may be converted to an RF signal and then combined on the output with the incoming return signal by the use of a diplex filter 22. The typical output signal level may be approximately 38-52 dBmv, while the return level may be approximately 15-20 dBmv. The bandwidth of the return is generally limited to 40 MHz by the diplex filter 22 and the crossover frequency between 40 and 51 MHz is generally unusable.

In the past, different attempts were made to try and overcome the above issues. As may be seen in FIGS. 3 and 4, attempts to use a directional coupler or a 2-way splitter both with and without phase cancellation were tired, but it proved to be problematic and was not pursued.

Therefore, it would be desirable to provide a device and method that overcomes all of the above issues.

SUMMARY OF THE INVENTION

In accordance with an embodiment of the present invention, a Cable Television (CATV) node circuit has a forward pathway having a fiber optic input and a forward output. The first pathway passes a forward signal to the forward output in a first frequency range. A return pathway is coupled to the forward pathway. The return pathway has a fiber optic output. The return pathway passes a return signal to the fiber optic output in a second frequency range, wherein the first frequency range is higher than the second frequency range. A cancellation circuit is coupled to the forward pathway and the return pathway. The cancellation circuit separates and isolates the forward signal from the return signal In accordance with another embodiment of the present invention, a Cable Television (CATV) node circuit has a forward pathway having a fiber optic input. The forward pathway has a forward output, wherein the first pathway passes a forward signal to the forward output in a first frequency range of approximately 51-1000 MHz. A return pathway is coupled to the forward pathway. The return pathway has a fiber optic output. The return pathway passes a return signal to the fiber optic output in a second frequency range of approximately 5-40 MHz. A cancellation circuit is coupled to the forward pathway and the return pathway. The cancellation circuit separates and isolates the forward signal from the return signal. The cancellation circuit samples the forward signal, adjust and inverts a phase of the forward signal and inserts the forward signal 180° out of phase into the return pathway.

In accordance with a further embodiment of the present invention, a node circuit has a forward pathway having a circuit input. The forward pathway has a forward pathway output, wherein the first pathway passes a forward signal to the forward pathway output in a first frequency range. A return pathway is coupled to the forward pathway. The return pathway has a return pathway output, wherein the return pathway passes a return signal to the return pathway output in a second frequency range, wherein the first frequency range is greater than the second frequency range. A cancellation circuit is coupled to the forward pathway and the return pathway. The cancellation circuit separates and isolates the forward signal from the return signal, wherein the cancellation circuit samples the forward signal, adjust and inverts a phase of the forward signal and inserts the forward signal 180° out of phase into the return pathway.

BRIEF DESCRIPTION OF THE DRAWINGS

Embodiments of the disclosure will become more fully understood from the detailed description and the accompanying drawings, wherein:

FIG. 6 is table showing node return analysis using the circuit of the present application.

DETAILED DESCRIPTION

Figure 1:
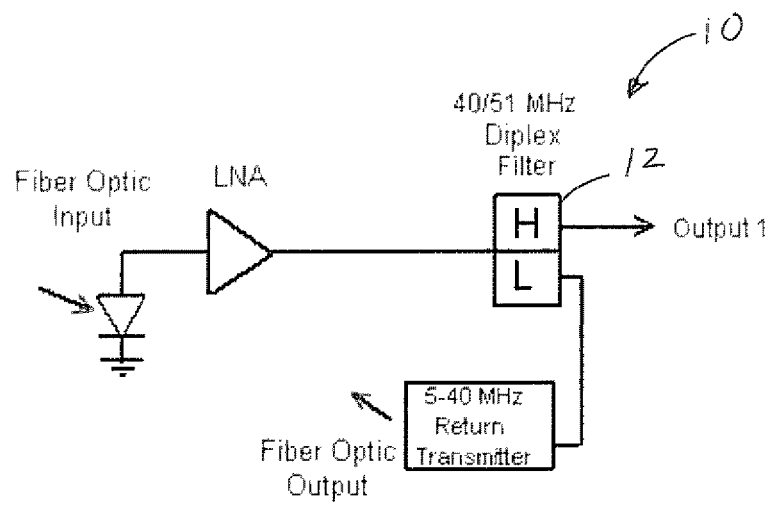
FIG. 1 is a block diagram of a typical prior art RFoG Optical Network Unit (R-ONU) with a diplex filter.
Figure 2:
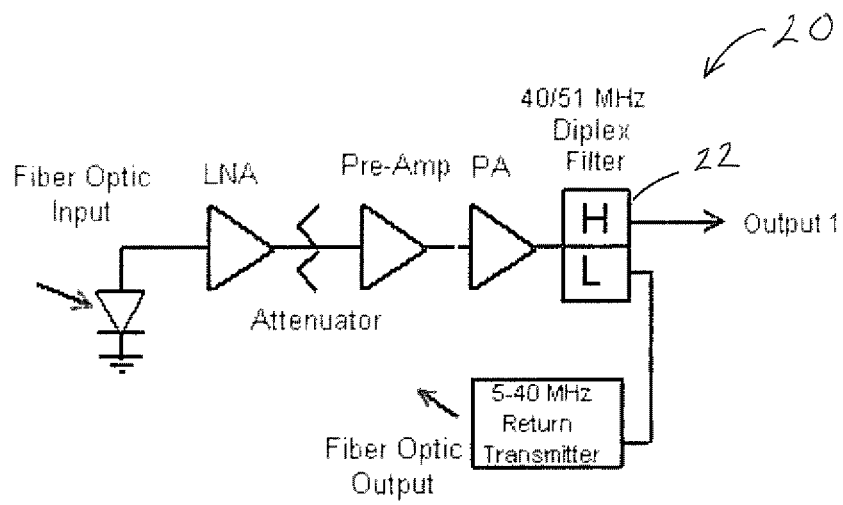
FIG. 2 is a block diagram of a typical prior art CATV Node with a diplex filter.
Figure 3A:
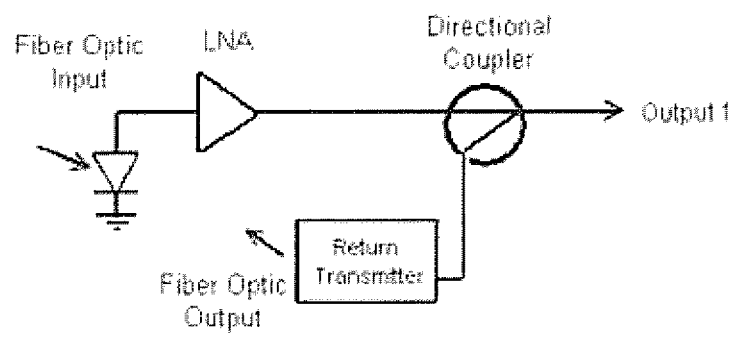
FIG. 3A is a block diagram of a prior art R-ONU device using a directional coupler.
Figure 3B:
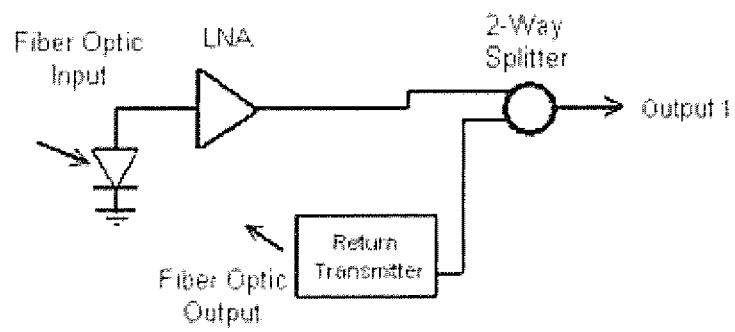
FIG. 3B is a prior art R-ONU using a 2-Way Splitter.
Figures 4, 5:
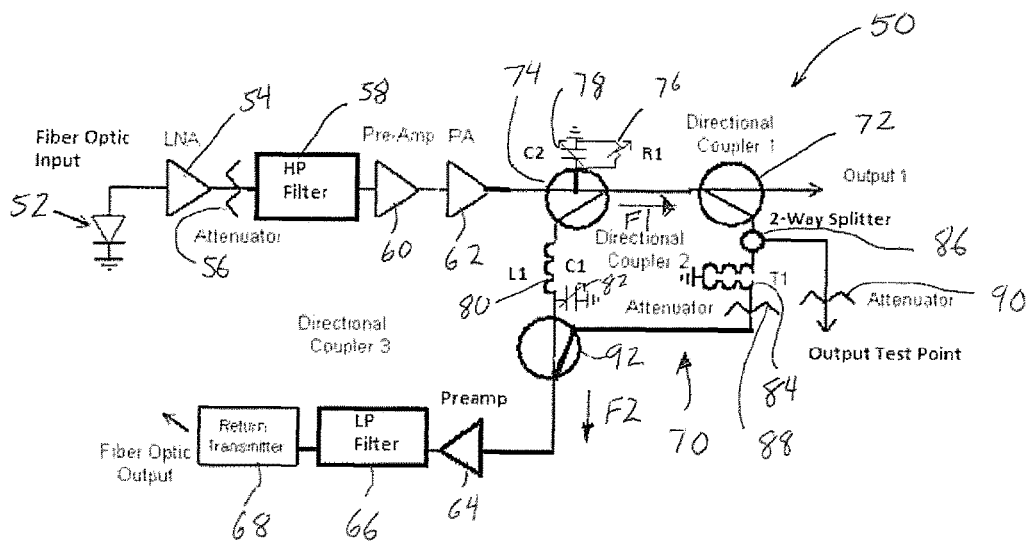
FIG. 4 is a table depicting R-ONU return analysis using the circuit of the present application.
FIG. 5 is a block diagram showing a node and R-ONU using the circuit of the present application.

In low level nodes, such as RFoG R-ONU's and Mini-Nodes, the diplexer filter may be replaced by a reverse directional coupler as the level differences between the forward output signal and the reverse input coupled with the directional coupler isolation are sufficient. In higher level nodes the level differences are not sufficient and in addition to the reverse directional coupler, a network of couplers and phase reversal transformers, and phase delay circuits, may be needed to increase the separation between the forward and reverse signals. By using this method there is no dead crossover zone, all frequencies may be used as long as they are either in the forward or reverse direction Referring to FIG. 5, a node circuit 50 (circuit 50) is shown. The node circuit 50 may allow one to expand or contract the return bandwidth simply by changing the frequency allocation in the head end. The circuit 50 has a fiber optic input 52. The fiber optic input 52 may be coupled to a low noise amplifier (LNA) 54. The LNA 54 may be used to amplify possibly weak signals received at the fiber optic input 52 in order to reduce possible losses in the line. An attenuator 56 may be coupled to an output of the LNA 54. The attenuator 56 may be used to reduce the amplitude of the signal being outputted.

A high pass (HP) filter 58 may be coupled to an output of the attenuator 56. The HP filter 58 may be used to pass signals of a desired high frequency range and reduce the amplitude of signals with frequencies lower than a cutoff frequency. The output of the HP filter 58 may be sent through a pre-amplifier 60 and power amplifier 62. The pre-amplifier 60 may be used to prepare the signal outputted from the HP filter 58 for further processing such as by the power amplifier 62.

The output of the power amplifier 62 may be coupled to a cancellation circuit 70. The cancellation circuit 70 may be used to achieve a predetermined amount of forward signal cancellation as will be explained below. A pre-amplifier 64 may be coupled to the cancellation circuit 70. The pre-amplifier 64 may be used to prepare the signal outputted from the cancellation circuit 70 for further processing. The output of the pre-amplifier 64 may be coupled to a low pass (LP) filter 66. The LP filter 66 may be used to pass signals with a frequency lower than a predetermined cutoff frequency. The output of the LP filter 66 may be sent to the return path transmitter 68.

In the circuit 50, a diplex filter may be replaced by the cancellation circuit 70. The cancellation circuit 70 allows one to separate the forward and reverse signals. The cancellation circuit 70 may allow all frequencies to be used as long as they are either in the forward or reverse direction. Thus, the circuit 50 has no dead crossover zone.

The cancellation circuit 70 has a first directional coupler 72 and a second directional coupler 74. A terminating resistor 76 and a small adjustable capacitor 78 are coupled to the second directional coupler 74. The terminating resistor 76 is adjustable and is in parallel with the adjustable capacitor 78 to maximize the isolation between a forward pathway F1 and return pathway F2. The phase of the reverse signal may be adjusted with an inductor 80 which is coupled to the second directional coupler 74 and an adjustable capacitor 82 which may be coupled to the inductor 80. A phase reversal transformer 84 may be coupled to the first directional coupler 72. A two way splitter 86 may be coupled to the phase reversal transformer 84 and the first directional coupler 72 to provide an output test point. An attenuators 88 may be coupled to an output of the phase reversal transformer 84. An attenuator 90 may be coupled between the two way splitter 86 and the output test point.

The forward signals may be passed through a HP filter 58 with a cutoff frequency of the lowest frequency to be utilized in the forward direction F1. By sampling the outgoing forward signals with the first directional coupler 72, adjusting and then inverting the phase of the signals in the phase reversal transformer 84, then inserting the forward signals 180° out of phase back into the reverse signal path with a third directional coupler 92, up to 25 dB of forward signal cancellation may be achieved. Following the cancellation circuit is pre-amplifier 64 to offset the losses of the directional coupler's followed by the low pass filter 66 with a cutoff frequency of the highest reverse frequency to be used F2. By adjustment of the attenuator 88 and inductor 80, adjustable capacitor 82, adjustable resistor 76 and adjustable capacitor 78, high rejection of the forward signal can be realized in at the frequencies between F1 and F2, which is typically 50 to 85 MHz. The resultant isolation and separation may be shown in the Table depicted in FIG. 4 for an R-ONU and FIG. 6 for a Node. This will open up the crossover frequency between both sides of the diplexer for use.

While embodiments of the disclosure have been described in terms of various specific embodiments, it will be recognized and understood by those skilled in the art that the embodiments of the disclosure may be practiced with modifications without departing from the spirit and scope of the invention.

What is claimed is:

1. A Cable Television (CATV) node circuit comprising:
   a forward pathway having a fiber optic input, the forward pathway having a forward pathway output, wherein the forward pathway passes a forward signal to the forward pathway output in a first frequency range;
   a return pathway coupled to the forward pathway, the return pathway having a fiber optic output, wherein the return pathway passes a return signal to the fiber optic output in a second frequency range, wherein the first frequency range is higher than the second frequency range; and
   a cancellation circuit coupled to the forward pathway and the return pathway, wherein the cancellation circuit separates and isolates the forward signal from the return signal, wherein the cancellation circuit comprises:
  a plurality of directional couplers to separate and isolate the forward signal from the return signal;
  a Resistor-Capacitor (RC) circuit coupled to one of the plurality of directional couplers;
  an Inductor-Capacitor (LC) circuit coupled to another of the plurality of directional couplers to adjust a phase of the return signal; and
  a phase reversal transformer coupled to a third of the plurality of directional couplers, the phase reversal transformer inverting the phase of the forward signals 180° out of phase and back into the return pathway via the third of the plurality of directional couplers.

2. The CATV node circuit in accordance with claim 1, wherein the first frequency range comprises one of: 51-1000 MHz or 85-1000 MHz.

3. The CATV node circuit in accordance with claim 1, wherein the second frequency range comprises one of: 5-40 MHz or 5-65 MHz.

4. The CATV node circuit in accordance with claim 1, wherein the forward pathway comprises:
  a high pass filter coupled to the fiber optic input; and
  a power amplifier having an input coupled to an output of the high pass filter and an output coupled to the cancellation circuit.

5. The CATV node circuit in accordance with claim 1, wherein the return pathway comprises:
  a return pathway amplifier coupled to the cancellation circuit; and
  a low pass filter having an input coupled to an output of the return pathway amplifier and an output coupled to the fiber optic output.

6. A Cable Television (CATV) node circuit comprising:
  a forward pathway located on a CATV node and having a fiber optic input, the forward pathway having a forward pathway output, wherein the forward pathway passes a forward signal to the forward pathway output in a first frequency range of 51-1000 MHz;
  a return pathway located on the CATV node and coupled to the forward pathway, the return pathway having a fiber optic output, wherein the return pathway passes a return signal to the fiber optic output in a second frequency range of 5-40 MHz; and
  a cancellation circuit located on the CATV node and coupled to the forward pathway and the return pathway, wherein the cancellation circuit separates and isolates the forward signal from the return signal within the node, wherein the cancellation circuit samples the forward signal, adjust and inverts a phase of the forward signal and inserts the forward signal 180° out of phase into the return pathway, wherein the cancellation circuit comprises:
  a plurality of directional couplers to separate and isolate the forward signal from the return signal;
  a Resistor-Capacitor (RC) circuit coupled to one of the plurality of directional couplers;
  an Inductor-Capacitor (LC) circuit coupled to another of the plurality of directional couplers to adjust a phase of the return signal; and
  a phase reversal transformer coupled to a third of the plurality of directional couplers, the phase reversal transformer inverting the phase of the forward signals 180° out of phase and back into the return pathway via the third of the plurality of directional couplers.

7. The CATV node circuit in accordance with claim 6, wherein the plurality of directional couplers comprises:
  a first directional coupler to send a signal to an output of the forward pathway;
  a second directional coupler coupled to the first directional coupler and to the fiber optic input, the RC circuit coupled to the second directional coupler; and
  a third directional coupler coupled to the return pathway, the LC circuit coupled to the third directional coupler;
  wherein the phase reversal transformer is coupled to the first and the third directional couplers.

8. The CATV node circuit in accordance with claim 7, wherein the cancellation circuit comprises a 2-way splitter coupled to the first directional coupler and the phase reversal transformer.

9. The CATV node circuit in accordance with claim 6, wherein the forward pathway comprises:
  a high pass filter coupled to the fiber optic input; and
  a power amplifier having an input coupled to an output of the high pass filter and an output coupled to the cancellation circuit.

10. The CATV node circuit in accordance with claim 6, wherein the return pathway comprises:
  a return pathway amplifier coupled to the cancellation circuit; and
  a low pass filter having an input coupled to an output of the return pathway amplifier and an output coupled to the fiber optic output.

11. A Cable Television (CATV) node circuit comprising:
  a forward pathway having a circuit input, the forward pathway having a forward pathway output, wherein the forward pathway passes a forward signal to the forward pathway output in a first frequency range;
  a return pathway coupled to the forward pathway, the return pathway having a return pathway output, wherein the return pathway passes a return signal to the return pathway output in a second frequency range, wherein the first frequency range is greater than the second frequency range;
  a cancellation circuit coupled to the forward pathway and the return pathway, wherein the cancellation circuit separates and isolates the forward signal from the return signal, wherein the cancellation circuit samples the forward signal, adjust and inverts a phase of the forward signal and inserts the forward signal 180° out of phase into the return pathway, wherein the cancellation circuit comprises:
  a plurality of directional couplers to separate and isolate the forward signal from the return signal;
  a Resistor-Capacitor (RC) circuit coupled to one of the plurality of directional couplers;
  an Inductor-Capacitor (LC) circuit coupled to another of the plurality of directional couplers to adjust a phase of the return signal; and
  a phase reversal transformer coupled to a third of the plurality of directional couplers, the phase reversal transformer inverting the phase of the forward signals 180° out of phase and back into the return pathway via the third of the plurality of directional couplers.

12. The CATV node circuit in accordance with claim 11, wherein the plurality of directional couplers comprises:
  a first directional coupler to send a signal to an output of the forward pathway;
  a second directional coupler coupled to the first directional coupler and to the circuit input, the RC circuit coupled to the second directional coupler;

a third directional coupler coupled to the return pathway, the LC circuit coupled to the third directional couplers; and wherein the a phase reversal transformer is coupled to the first and the third directional couplers.

13. The CATV node circuit in accordance with claim 12, wherein the cancellation circuit comprises a 2-way splitter coupled to the first directional coupler and the phase reversal transformer.

14. The CATV node circuit in accordance with claim 11, wherein the forward pathway comprises:
   a high pass filter coupled to the circuit input; and
   a power amplifier having an input coupled to an output of the high pass filter and an output coupled to the cancellation circuit.

15. The CATV node circuit in accordance with claim 11, wherein the return pathway comprises:
   a return pathway amplifier coupled to the cancellation circuit; and
   a low pass filter having an input coupled to an output of the return pathway amplifier and an output coupled to the return pathway output.

* * * * *